(12) United States Patent
Junker et al.

(10) Patent No.: US 6,431,966 B1
(45) Date of Patent: Aug. 13, 2002

(54) GRINDING SPINDLE UNIT WITH MAGNETIC DRIVE

(75) Inventors: Erwin Junker, Buehl/Baden; Juergen Lindner, Grosswallstadt, both of (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 0 days.

(21) Appl. No.: 09/743,944

(22) PCT Filed: Apr. 14, 1999

(86) PCT No.: PCT/EP99/02524

§ 371 (c)(1),
(2), (4) Date: Jan. 17, 2001

(87) PCT Pub. No.: WO00/05033

PCT Pub. Date: Feb. 3, 2000

(51) Int. Cl.[7] ................................................. B24B 17/00
(52) U.S. Cl. ........................................ 451/251; 451/360
(58) Field of Search ........................... 451/251, 62, 264, 451/342, 360, 181, 363; 74/8, 339

(56) References Cited

U.S. PATENT DOCUMENTS 5,569,111 A * 10/1996 Cho et al. .................... 475/149

FOREIGN PATENT DOCUMENTS

| DE | 4426452 | 9/1995 |
|---|---|---|
| DE | 4137924 C2 | 12/1997 |
| DE | 19635687 | 3/1998 |
| EP | 0583035 | 2/1994 |
| WO | WO82/01149 | 4/1982 |

* cited by examiner

Primary Examiner—Timothy V. Eley
Assistant Examiner—Dung Van Nguyen
(74) Attorney, Agent, or Firm—Jordan and Hamburg LLP

(57) ABSTRACT

The present invention provides a drive for a grinding wheel of a cam grinding machine, in which case an electric motor is provided with a drive wheel, the drive wheel is provided with equispaced, annular recesses, the annular recesses are fitted on the radial surfaces with permanent magnets, a grinding spindle rotor is provided with equispaced, annular recesses, the radial surfaces of the annular recesses are fitted with permanent magnets, and the annular recesses, fitted with permanent magnets, of the drive wheel and the rotor intermesh.

15 Claims, 3 Drawing Sheets

GRINDING SPINDLE UNIT WITH MAGNETIC DRIVE

BACKGROUND OF THE INVENTION

The present invention relates to a drive for a grinding wheel of a cam grinding machine with which cams having concave flanks can be ground out.

The grinding of cams having concave contours belongs to the prior art, in which case grinding wheels whose radius is smaller than a radius of curvature of a concave region of the cams are used. DE 44 26 452C1 discloses, inter alia, a machine for grinding cams, having concave flanks, of a camshaft which uses three grinding wheels. The machine comprises a slide which is traversable on a bed of the machine in a radial direction relative to the camshaft to be ground and on which two grinding spindles having a rough-grinding wheel and a finish-grinding wheel are mounted. The two grinding spindles are mounted in a common spindle head in such a way that the spindle axes intersect at an angle or run parallel to one another. The spindle head is pivotable about an axis running perpendicularly to the camshaft. A third grinding wheel, the diameter of which corresponds to approximately twice the radius of the concave flanks of the cams to be ground on the camshaft, is arranged next to the finish-grinding wheel on its grinding spindle. This prior art does not contain any more detailed information on the type of drive of the grinding spindles.

A grinding machine which is constructed according to the piggyback principle has previously been described in DE 41 37 924 C2. This machine comprises a first grinding slide, which is movable in a direction perpendicular to a longitudinal axis of the camshaft and carries a first grinding wheel having a large diameter. Arranged on the first grinding slide is a second grinding slide having a second grinding wheel, which has a smaller diameter than the radius of curvature of the cam flank, to be ground out, of a cam. This prior art also does not contain more extensive information on the drive of the grinding spindle.

DE 196 35 687 discloses a camshaft grinding machine in which the grinding spindle unit is mounted hydrodynamically or hydrostatically.

Finally, grinding machines whose grinding spindles have either a direct drive via a high-frequency grinding spindle motor or a belt drive belong to the prior art. However, the grinding spindles driven directly with a high-frequency motor have the disadvantage that the high-frequency motors, on account of their size, permit only limited dimensions of the camshafts with regard to their length and of the cam pitch with regard to the base circle radius. On the other hand, the grinding spindles driven with a belt drive have the disadvantage that only limited outputs at predetermined belt pulley diameters can be transmitted, and the belt, which is necessarily present, when deflected at right angles, applies high radial forces to an adjacent bearing on account of its pretension.

OBJECTS AND SUMMARY OF THE INVENTION

The object of the present invention is to provide a drive for a grinding wheel, with which drive the disadvantages of a direct drive using a high-frequency motor and of a drive using a belt drive are removed. In addition, the drive is to be capable of being produced in different diameter ratios and lengths, so that outputs and speeds can be transmitted within wide ranges.

The above object is achieved according to the present invention in such a way that a drive of a grinding spindle unit for transmitting the output and the torque of a grinding spindle motor is effected magnetically. Provided for this purpose is a drive wheel which is connected to a drive motor. Arranged on the circumference of the drive wheel are equispaced permanent-magnet rings, and meshing in clearances between the latter are permanent-magnet rings which are arranged in an equispaced manner on grinding spindle rotor. The permanent-magnet rings of the drive wheel and of the grinding spindle rotor are arranged relative to one another in a non-contacting manner. An air gap provided in each case in the axial direction is, for example, 0.05 to 0.4 mm. In this case, the magnet rings arranged on the drive wheel engage in the spaces formed by the equispaced magnet rings of the grinding spindle rotor, and vice versa.

In an embodiment of the present invention, a circumferential width of the drive wheel has equispaced recesses which are arranged in a radially encircling manner and which are lined at their flat sides with small permanent magnets. With due regard to the width of the recesses, lined with permanent magnets of the drive wheel, recesses fitting into these clearances are provided on a circumferential width of the grinding spindle rotor and are likewise lined laterally at the flat sides with permanent magnets. This design also takes into account the fact that the annular flat sides, lined with permanent magnets, of the recesses do not touch one another during the torque transmission, i.e., they are at a distance from one another. In this design, too, the air gap in the axial direction is, for example, 0.05 to 0.4 mm.

The center axes of the drive motor and the drive wheel are in alignment with one another and are arranged parallel to the center axis of the grinding spindle rotor. The center axis of the grinding spindle rotor is in turn preferably arranged in a horizontal and vertical plane parallel to the center axis of the camshaft.

The drive motor with drive wheel and the grinding spindle rotor are each arranged in a housing, and these housings are connected to one another by means of screws. These two housings connected to one another are fastened to a grinding spindle-head housing traversable in the X-axis direction. The grinding wheel is located on one free end of the grinding spindle rotor. The two end regions of the grinding spindle rotor are mounted in rolling bearing assemblies preloaded without play, the grinding-wheel-side end of the grinding spindle rotor serving as a fixed bearing unit and the opposite end serving as a floating bearing unit.

The complete grinding spindle unit comprises a housing which is of thin-walled design, so that there is still sufficient space relative to adjacent cams of a camshaft; for the cams arranged next to each other on the camshaft, on account of different angular positions of the cams on the camshaft, have a radius of revolution which is enlarged relative to the cam-base radius.

The complete grinding spindle unit housed towards the camshaft and fastened to the housing can be completely replaced by other grinding spindle units. In this way, it is possible for grinding spindle units of different size, i.e., size graduation, to be used for different applications, since no supply lines lead to the bearings and to the grinding spindle unit. This provides the advantage that, for different applications during grinding, in particular with regard to the grinding wheel diameter, different grinding spindle units can be changed over by simple replacement. Depending on the grinding problem to be solved on the spot, the respectively suitable grinding spindle unit can therefore be used, the ratio of the diameters of the drive wheel and of the grinding spindle rotor determining the transmission ratio. If the diameter of the grinding spindle rotor is enlarged, the torque which can be transmitted is increased, for a larger torque must be available during the use of larger grinding wheels.

The above drive according is characterized in that the drive motor and the drive wheel have a housing, in that the housing, in the region of the arrangement of the grinding spindle rotor, has an opening corresponding to the grinding spindle length and the diameter, in that the grinding spindle, in that the grinding spindle rotor has a sectional housing, in that the grinding spindle rotor is mounted at each end in the sectional housing, and in that the sectional housing can be mounted in a suitably interchangeable manner on the opening of the drive housing. Furthermore, the grinding spindle rotor has a spindle nose, on which a grinding wheel can be fastened by means of a fastening element.

BRIEF DESCRIPTION OF THE DRAWINGS

The drive according to the present invention is explained in more detail with reference to the drawings according to FIGS. 1 to 4 wherein.

DETAILED DESCRIPTION

Figure 1:
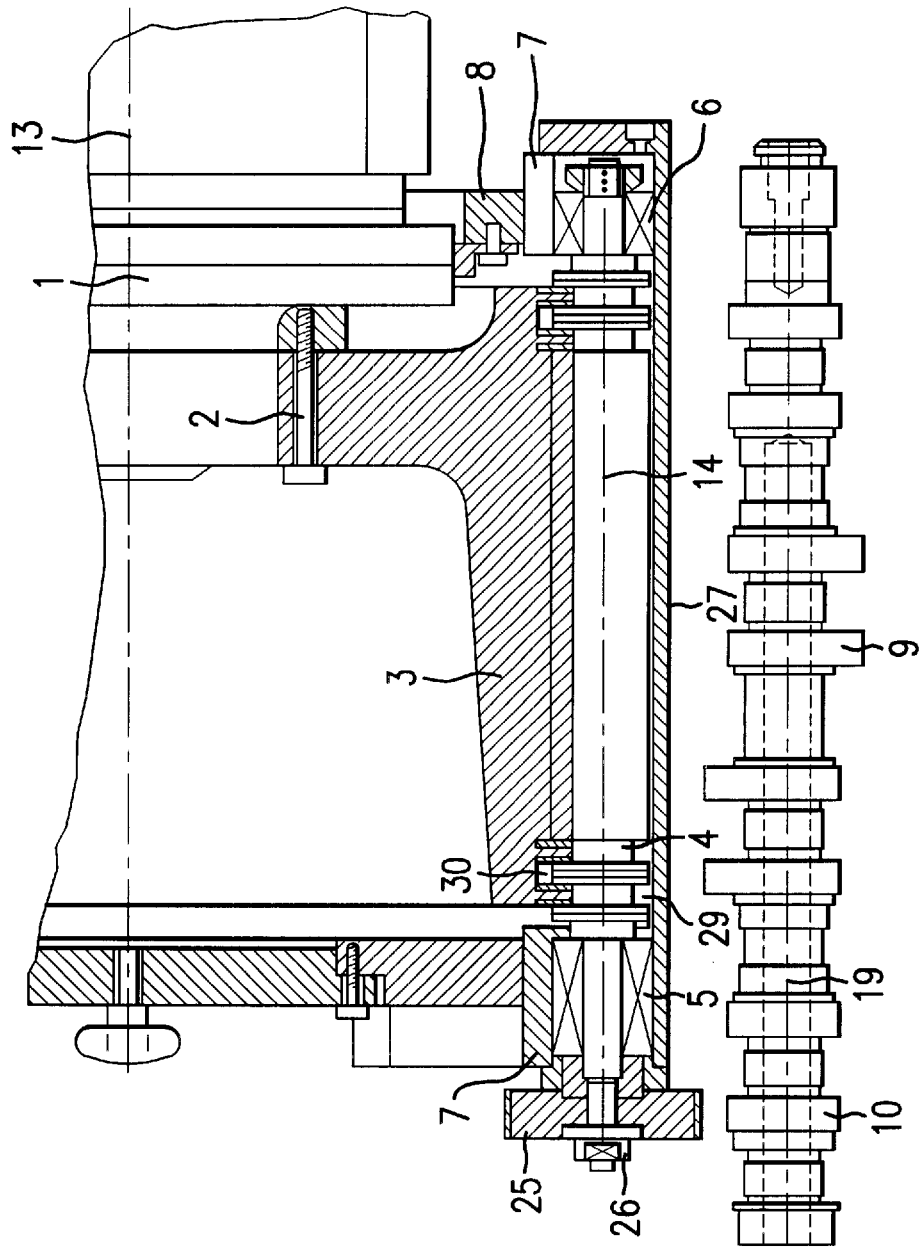
FIG. 1 shows partial longitudinal section of a drive wheel connected to a drive motor, with a grinding spindle rotor, arranged parallel thereto so as to mesh at a circumference fo the drive wheel, and a camshaft likewise arranged parallel thereto.
Figure 4:
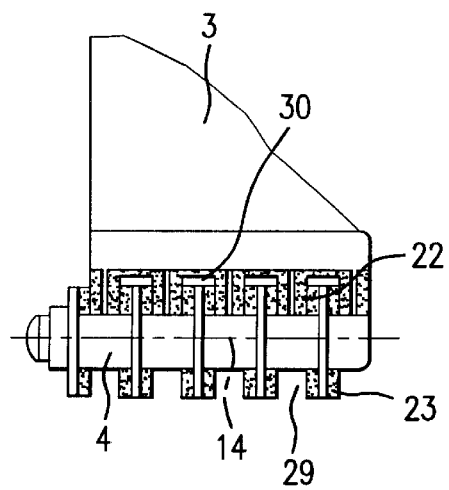
FIG. 4 shows a partial longitudinal section of a design of a spindle unit carried on rolling bearings and having a magnetically driven rotor.

FIG. 1 shows a partial longitudinal section of a housing 7 of a grinding spindle unit having rolling bearings at each end and having a magnetically driven grinding spindle rotor 4, on a circumferential surface of which equispaced, annular permanent magnets 23 are arranged as shown in FIG. 4. Equispaced, annular permanent magnets 22, which are arranged on a circumferential surface of a drive wheel 3, engage with slight clearance in clearance spaces defined by the permanent magnets 23. The drive wheel 3 is in turn connected to a drive motor 1, which may be an electric motor for example. When the drive wheel 3 is running, the permanent magnets 22 and 23 mesh relative to one another, so that a magnetic torque transmission to the grinding spindle rotor 4 is obtained. The drive wheel 3 is connected to the drive motor 1 via screws 2. From this arrangement, the transmission ratio is obtained from the diameter ratio of the drive wheel 3 to the grinding spindle rotor 4.

In an embodiment of the present invention, the outer circumference of the drive wheel 3 has radially projecting, annular recesses 30 which are machined from the body of the drive wheel 3 in a radially encircling manner and flat sides of which are lined with the small permanent magnets 22. The grinding spindle rotor 4 also has radially projecting, annular recesses 29 which are made by machining and flat sides of which are lined with the small permanent magnets 23. The recesses 30 and 29 are arranged so as to be equispaced over the circumferential width in such a way that, during assembly, these annular recesses 29 and 30 lined with permanent magnets 22 and 23 ensure an arrangement which meshes in a non-contacting manner. In this way, the torque of the drive wheel 3 is magnetically transmitted to the grinding spindle rotor 4.

At one free end, the grinding spindle rotor 4 carries a grinding wheel 25, which is secured on the grinding spindle rotor 4 at an end thereof with a screw 26 and shown in FIG. 1 grinding a cam 10. Starting from the grinding wheel 25, a fixed bearing unit 5 is immediately provided in the axial direction and may be, for example, a rolling bearing assembly which is preloaded without play and is arranged in that region of the housing 7 which faces the grinding wheel 25.

Provided at an opposite end of the grinding spindle rotor 4 is a floating bearing unit 6, which may likewise be, for example, a rolling bearing assembly which is preloaded without play and is likewise arranged in that region of the housing 7 which is opposite the grinding wheel 25. The equispaced, annular permanent magnets 23 are arranged between the fixed bearing unit 5 and the floating bearing unit 6 on the circumferential surface of the grinding spindle rotor 4. A camshaft 9 is provided parallel to the electric-motor-operated drive arrangement, comprising the drive motor 1, drive wheel 3, a housing of the grinding spindle unit with grinding spindle rotor 4 in meshing arrangement with annular permanent magnets 22, 23.

Figure 2:
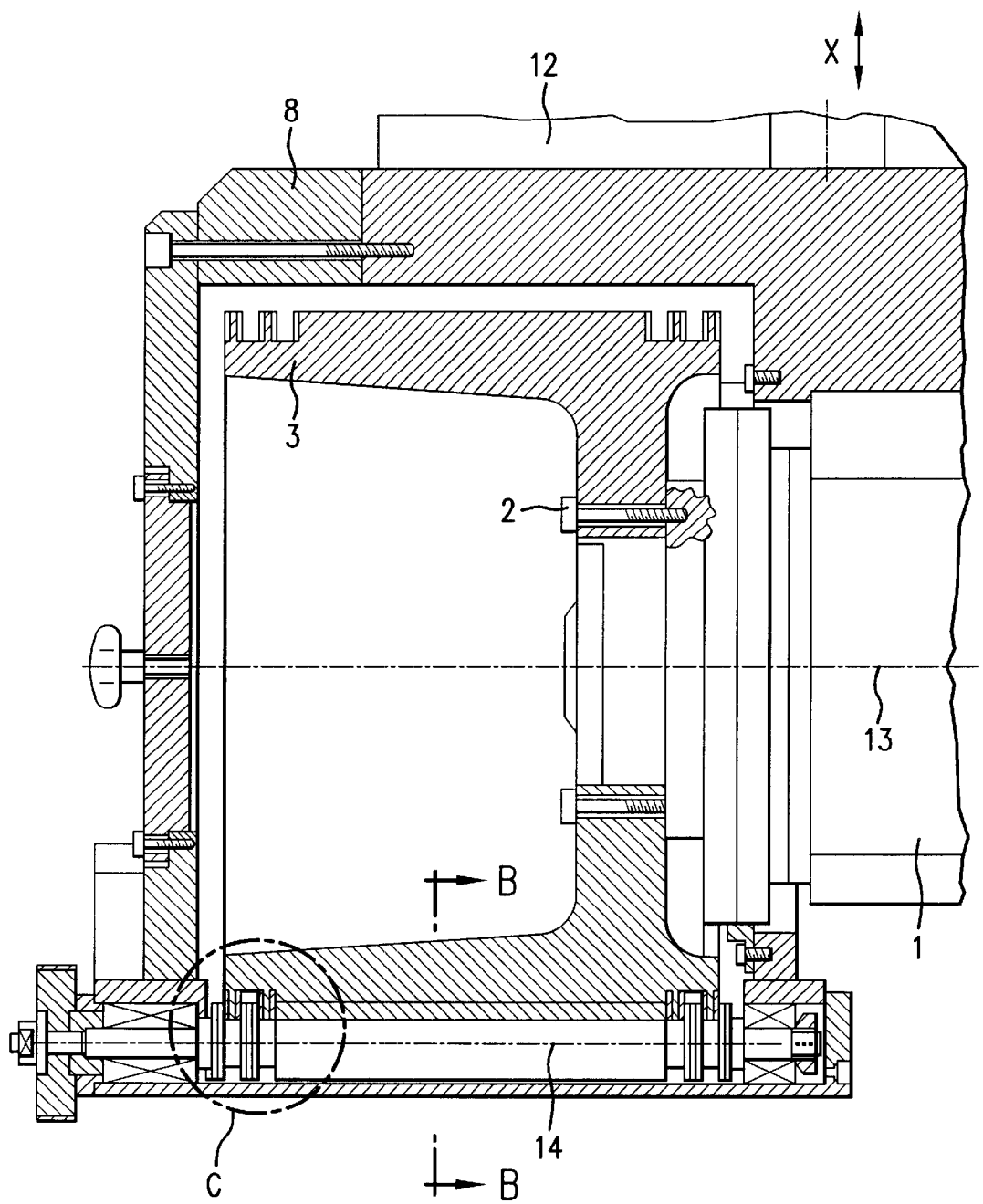
FIG. 2 shows the design according to FIG. 1 in combination with a grinding spindle head working in an X-axis.

FIG. 2 shows the drive wheel 3, which is fastened by means of screws 2 to the drive motor 1. Furthermore, the housing for the drive wheel 3 and the drive motor 1 is shown coupled to a grinding spindle head 12 along with the CNC motion axis X. Furthermore, this graphic representation draws attention to a sectional representation B—B with the designation C, as contained in FIGS. 3 and 4. The drive wheel 3 is fastened by means of screws 2 to the drive motor 1 in an axially aligned manner in such a way as to follow the center axis 13. The grinding spindle rotor 4, which is provided with a grinding wheel 25 on one side at the end, is arranged parallel to this center axis 13, as demonstrated by its center axis 14.

Figure 3:
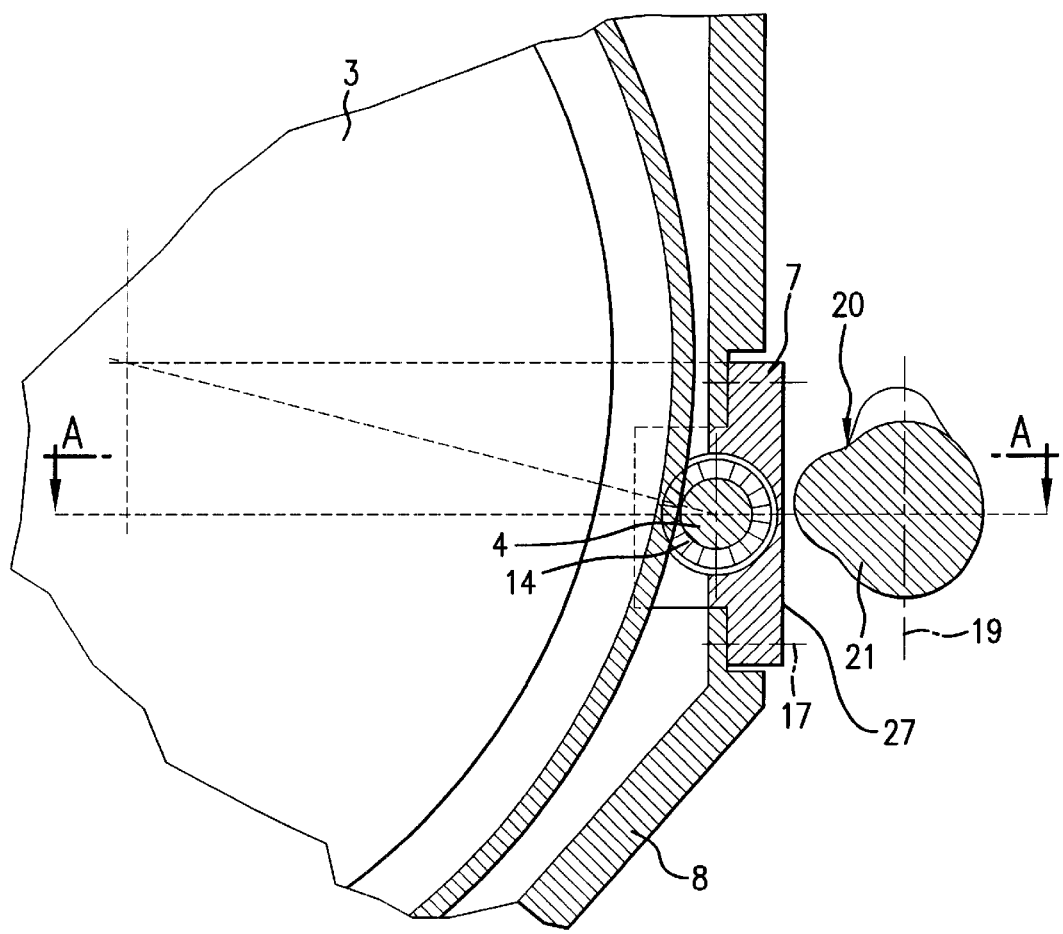
FIG. 3 shows an enlarged cross section B—B according to FIG. 2.

FIG. 3 shows section B—B according to FIG. 2. Accordingly, the housing 7 is provided as half shell adapted in diameter to the grinding spindle rotor 4 and extends over the entire length of the grinding spindle rotor 4, and its fastening flange on both sides can be inserted into corresponding apertures of the housing 8, which houses the drive 1 and the drive wheel 3. The housing 7 is connected to the housing 8 with screws 17. The outer shell of the housing 7 has a thin-walled region 27. The fixed-bearing unit 5 and the floating bearing unit 6 are each additionally arranged in the housing 7. The center axis 14 is parallel to the common center axis 13 of the drive 1 and the drive wheel. From the associated sectional representation of the camshaft 9, a cam with opposite concave flank regions 20 and 21 is shown in sectional representation. In addition, section A—A as shown in FIG. 1 is contained in FIG. 3.

Finally, FIG. 4 shows a partial section of the meshing arrangement of the annular permanent magnets 22, equispaced on one side over the circumferential width of the drive wheel 3, and the annular permanent magnets 23, which project radially from the circumferential surface of the grinding spindle rotor and are arranged so as to mesh between the permanent magnets 22 of the drive wheel 3. In addition, this representation shows that recesses made by machining over the surface region of the drive wheel 3 are provided in such a way as to project radially in an equispaced manner, these recesses being lined with small permanent magnets 22 on their flat sides. The recesses 30 are therefore coated in an annular manner on both sides with the permanent magnets 22, or the latter are adhesively bonded to the recesses. In a similar manner, the grinding spindle rotor 4 is also provided with equispaced, machined recesses 29, which are likewise lined on their flat sides with the small permanent magnets 23, or the latter are adhesively bonded to them. In an embodiment of the present invention, the flat sides may have permanent magnets 22 and 23 adhesively bonded to them or may be coated with a permanent-magnet sintered-metal alloy.

What is claimed is:

1. A drive for a grinding wheel of a cam grinding machine, comprising:

an electric motor provided with a drive wheel, the drive wheel being provided with equispaced, first annular recesses having radial surfaces with permanent magnets, a grinding-spindle rotor provided with equispaced, second annular recesses having radial surfaces fitted with permanent magnets, and the first and second annular recesses respectively of the drive wheel and the grinding-spindle rotor intermeshing.

2. The drive according to claim 1, further comprising:

a drive housing housing the drive motor and the drive wheel having, in a region of the grinding-spindle rotor, an opening corresponding to a length of the grinding-spindle rotor, a sectional housing housing the grinding-spindle rotor with the grindingspindle rotor being mounted at first and second ends thereof in the sectional housing, and the sectional housing being mounted in an interchangeable manner on the opening of the drive housing.

3. The drive according to claim 1 or 2, wherein the grindingspindle rotor carries a grinding wheel at the first end.

4. The drive according to claim 2, wherein the grinding-spindle rotor is mounted in the sectional housing in a fixed-bearing unit on a grinding wheel side at the first end and in a floating-bearing unit at the second end.

5. The drive according to claim 4, wherein the fixed-bearing unit and the floating-bearing unit are in each case designed as rolling-bearing assemblies preloaded without play.

6. The drive according to claim 1 or 2, wherein the grindingspindle rotor has a spindle nose, on which a grinding wheel can be fastened by means of a fastening element.

7. The drive according to claim 1 or 2, wherein the grindingspindle rotor and the sectional housing are designed to be replaceable as an interchangeable spindle unit in different sizes.

8. A magnetic drive unit for transferring torque from an output shaft, comprising:

a drive wheel, connectable to said output shaft, having first radial surfaces defining first annular recesses;

said first radial surfaces including first permanent magnets;

a rotor having second radial surfaces defining second annular recesses;

said second radial surfaces including second permanent magnets; and housing structure rotatably supporting said drive wheel and said rotor with said drive wheel intermeshing with said rotor such that said first permanent magnets oppose said second permanent magnets in an axial direction of said drive wheel and said rotor to magnetically transfer torque from said drive wheel to said rotor.

9. The drive according to claim 8, wherein said housing structure includes:

a first housing housing said drive wheel having, in a region of said rotor, an opening corresponding to a length of said rotor;

a sectional housing housing said rotor with said rotor being mounted at first and second ends thereof in said sectional housing; and said sectional housing being mounted in an interchangeable manner on said opening of said drive housing.

10. The drive according to claim 9, wherein said rotor is mounted in said sectional housing in a fixed-bearing unit on said first end and in a floating-bearing unit at said second end.

11. The drive according to claim 10, wherein said fixed-bearing unit and said floating-bearing unit are rolling-bearing assemblies preloaded without play.

12. The drive according to claim 8, wherein said rotor has a spindle nose.

13. The drive according to claim 8, wherein said first and second annular recesses are equidistantly disposed along said axial direction.

14. A magnetic drive unit for transferring torque from an output shaft, comprising:

a drive wheel, connectable to said output shaft, having first radial surfaces defining first annular recesses;

said first radial surfaces including first permanent magnets;

a rotor having second radial surfaces defining second annular recesses;

said second radial surfaces including second permanent magnets;

a first housing rotatably supporting said drive wheel having an opening providing access to said drive wheel;

a sectional housing rotatably supporting said rotor and mountable on said first housing at said opening such that said drive wheel intermeshes with said rotor such that said first permanent magnets oppose said second permanent magnets in an axial direction of said drive wheel and said rotor to magnetically transfer torque from said drive wheel to said rotor.

15. The drive according to claim 14, wherein said first and second annular recesses are equidistantly disposed along said axial direction.

* * * * *